(12) United States Patent
Saeed

(10) Patent No.: US 8,863,824 B2
(45) Date of Patent: Oct. 21, 2014

(54) DOWNHOLE SENSOR INTERFACE

(75) Inventor: Gohar Saeed, Stafford, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 539 days.

(21) Appl. No.: 12/427,795

(22) Filed: Apr. 22, 2009

(65) Prior Publication Data

US 2009/0229820 A1    Sep. 17, 2009

(51) Int. Cl.
*E21B 47/12* (2012.01)

(52) U.S. Cl.
CPC .......... *E21B 47/12* (2013.01); *H04B 2203/5475* (2013.01)
USPC ............................................ 166/66; 166/65.1

(58) Field of Classification Search
USPC ...................... 166/250.01, 65.1, 66
See application file for complete search history.

(56) References Cited

U.S. PATENT DOCUMENTS

| | | | |
|---|---|---|---|
| 5,752,572 A | 5/1998 | Baiden et al. | |
| 5,826,654 A * | 10/1998 | Adnan et al. | 166/250.01 |
| 6,082,461 A | 7/2000 | Newman et al. | |
| 6,089,323 A | 7/2000 | Newman et al. | |
| 6,241,031 B1 | 6/2001 | Beaufort et al. | |
| 6,273,189 B1 * | 8/2001 | Gissler et al. | 166/241.1 |
| 6,347,674 B1 | 2/2002 | Bloom et al. | |
| 6,396,414 B1 | 5/2002 | Bickford et al. | |
| 6,427,786 B2 | 8/2002 | Beaufort et al. | |
| 6,454,011 B1 | 9/2002 | Schempf et al. | |
| 6,464,003 B2 | 10/2002 | Bloom et al. | |
| 6,467,557 B1 | 10/2002 | Krueger et al. | |
| 6,478,097 B2 | 11/2002 | Bloom et al. | |
| 6,640,894 B2 | 11/2003 | Bloom et al. | |
| 6,675,888 B2 | 1/2004 | Schempf et al. | |
| 6,679,341 B2 | 1/2004 | Bloom et al. | |
| 6,715,559 B2 | 4/2004 | Bloom et al. | |
| 6,722,442 B2 | 4/2004 | Simpson | |
| 6,745,854 B2 | 6/2004 | Bloom et al. | |
| 6,868,906 B1 | 3/2005 | Vail, III et al. | |
| 6,910,533 B2 | 6/2005 | Guerrero | |
| 6,938,708 B2 | 9/2005 | Bloom et al. | |
| 7,048,047 B2 | 5/2006 | Bloom et al. | |
| 7,080,700 B2 | 7/2006 | Bloom et al. | |
| 7,080,701 B2 | 7/2006 | Bloom et al. | |
| 7,121,364 B2 | 10/2006 | Mock et al. | |
| 7,143,843 B2 | 12/2006 | Doering et al. | |
| 7,156,192 B2 | 1/2007 | Guerrero et al. | |
| 7,174,974 B2 | 2/2007 | Bloom et al. | |
| 7,185,714 B2 | 3/2007 | Doering et al. | |

(Continued)

FOREIGN PATENT DOCUMENTS

| | | |
|---|---|---|
| CN | 1560302 A | 1/2005 |
| EP | 1079465 A2 | 2/2001 |

(Continued)

*Primary Examiner* — Brad Harcourt
(74) *Attorney, Agent, or Firm* — Trevor Grove

(57) ABSTRACT

An interface to provide coupling between a downhole sensor and wiring to other electrical equipment. The interface is configured to obtain voltage from a single power line and provide it to the downhole sensor while simultaneously converting sensor data to frequency form for transmission right back over the same power line. In this manner a substantial reduction in downhole wiring may be obtained. This may be particularly beneficial for sensors to be incorporated into downhole equipment where size and space issues are prevalent, particularly in the circumstance of equipment requiring a retrofit in order to accommodate the sensor capacity.

10 Claims, 5 Drawing Sheets

(56) References Cited

U.S. PATENT DOCUMENTS

| | | |
|---|---|---|
| 7,222,682 B2 | 5/2007 | Doering et al. |
| 7,252,143 B2 | 8/2007 | Sellers et al. |
| 2002/0029908 A1 | 3/2002 | Bloom et al. |
| 2002/0104686 A1 | 8/2002 | Bloom et al. |
| 2003/0116356 A1 | 6/2003 | Bloom et al. |
| 2003/0121703 A1* | 7/2003 | Bloom et al. .................... 175/99 |
| 2003/0173076 A1* | 9/2003 | Sheiretov et al. .......... 166/241.1 |
| 2003/0188875 A1 | 10/2003 | Bloom et al. |
| 2004/0020644 A1* | 2/2004 | Wilson et al. ............ 166/250.01 |
| 2004/0245018 A1 | 12/2004 | Bloom et al. |
| 2005/0082055 A1 | 4/2005 | Bloom et al. |
| 2005/0145415 A1 | 7/2005 | Doering et al. |
| 2005/0205304 A1* | 9/2005 | Gurjar et al. .................... 175/75 |
| 2005/0247488 A1 | 11/2005 | Mock et al. |
| 2005/0252686 A1 | 11/2005 | Bloom et al. |
| 2006/0196694 A1 | 9/2006 | Bloom et al. |
| 2006/0196696 A1 | 9/2006 | Bloom et al. |
| 2008/0196901 A1 | 8/2008 | Aguirre et al. |
| 2008/0202769 A1 | 8/2008 | Dupree et al. |

FOREIGN PATENT DOCUMENTS

| | | |
|---|---|---|
| EP | 1344893 A2 | 9/2003 |
| GB | 2346908 A | 8/2000 |
| GB | 2351308 A | 12/2000 |
| GB | 2362405 A | 11/2001 |
| GB | 2370056 A | 6/2002 |
| GB | 2378468 A | 2/2003 |
| GB | 2378469 A | 2/2003 |
| GB | 2380755 A | 4/2003 |
| GB | 2389135 A | 12/2003 |
| GB | 2413816 A | 11/2005 |
| GB | 2414499 A | 11/2005 |
| WO | 9510683 A1 | 4/1995 |
| WO | 0036266 A1 | 6/2000 |
| WO | 0046481 A2 | 8/2000 |
| WO | 0109478 A1 | 2/2001 |
| WO | 0244509 A2 | 6/2002 |
| WO | 2004072433 A2 | 8/2004 |
| WO | 2005090739 A1 | 9/2005 |

* cited by examiner

DOWNHOLE SENSOR INTERFACE

FIELD

Embodiments described herein relate to sensors for use in downhole applications in a well at an oilfield. In particular, embodiments of interfaces for electronic coupling to leads of such sensors are described in particular detail.

BACKGROUND

In the oilfield industry, well applications often employ a variety of sensors coupled to downhole equipment to provide information relative to the well or equipment during a given application. For example, temperature, pressure, and other well conditions may be monitored as well as readings related to the equipment itself. These equipment readings may involve the monitoring of load and/or pressure imparted on the equipment during an application.

Downhole equipment may include downhole tractors, for example, to drive a downhole tool through a horizontal or highly deviated well at an oilfield. In this manner, the tool may be positioned at a well location of interest in spite of the non-vertical nature of such wells. Different configurations of downhole tractors may be employed for use in such a well. For example, a reciprocating or "passive" tractor may be utilized which employs separate adjacent sondes with actuatable anchors for interchangeably engaging the well wall. That is, the sondes may be alternatingly immobilized with the anchors against a borehole casing at the well wall and advanced in an inchworm-like fashion through the well. Alternatively, an "active" or continuous movement tractor employing tractor arms with driven traction elements thereon may be employed. Such driven traction elements may include wheels, cams, pads, tracks, or chains. With this type of tractor, the driven traction elements may be in continuous movement at the borehole casing interface, thus driving the tractor through the well.

Regardless of the tractor configuration chosen, the tractor, along with several thousand pounds of equipment, may be pulled thousands of feet into the well for performance of an operation at a downhole well location of interest. It is over the course of such applications that monitoring conditions of the well and/or equipment with a sensor as noted above may be of particular benefit. For example, as the equipment is positioned deeper and deeper within the well, the load of the tractor assembly may approach a level that is beyond the load capacity of the tractor. Thus, monitoring load may play a significant role in carrying out such an operation. Therefore, a load sensor may be incorporated into the tractor assembly.

Whether it be load, pressure or another condition being monitored, it is likely that the sensor is of a conventional strain gauge configuration. Generally, this includes the use of four leads that are run between the sensor and a microprocessor. These leads include two exitation leads, one for power, the other for ground. Two output leads are also provided to transmit data between the sensor and the microprocessor.

Space available on the downhole tractor comes at a premium. That is, the well may offer less than about 12 inches in diameter to work with. Thus, the profile of the tractor may be minimal. As a result, features incorporated into the body of the tractor may be of limited sizing as well. The same may go for the overall amount of features employed in conjunction with the tractor. Indeed, the amount of wiring that is employed downhole may even be kept at a minimum. For example, where a downhole sensor is employed as described above, the downhole microprocessor may be positioned relatively near the sensor. In this manner, the amount of wiring may be kept at a minimum. This may be particularly beneficial in the case of a downhole sensor which is likely to make use of numerous wiring leads, generally about four, as also noted above.

Unfortunately, even where a relatively short distance is utilized between the microprocessor and the sensor, a substantial amount of wiring may still be present over such a distance. For example, a separation of no more than about four inches between the sensor and the microprocessor still results in at least 16 inches of wiring due to the numerous leads employed by the sensor. As a result, many tractor assemblies fail to employ downhole sensors in order to preserve space. This may be particularly true for assemblies that would require retrofitting in order to accommodate such a sensor.

SUMMARY

An electronic assembly is described for downhole use in a well. The assembly includes a processor with a power line running therefrom. A sensor for measuring a condition relative to the well is also provided. Thus, an interface is also provided that is coupled to the sensor and the power line in order to allow power and data communication over the power line and between the processor and sensor.

DETAILED DESCRIPTION

Embodiments of a downhole sensor interface are described with reference to certain downhole equipment. Indeed, focus is drawn to a downhole tractor assembly employing an embodiment of a sensor interface. In particular, a reciprocating downhole tractor assembly is depicted in many figures of the present Application. However, a variety of downhole equipment types may employ a sensor that is coupled to an embodiment of a sensor interface as detailed herein. Embodiments of the downhole sensor interface are configured to for simultaneously coupling to a conventional multi-line portion of a downhole sensor and a single power line of a microprocessor. Thus, data and power transmission may simultaneously be transmitted over the power line, thereby reducing the overall amount of wiring employed in the assembly. As a result, any number of downhole equipment types may be equipped with a sensor in a manner taking advantage of the reduced wiring requirements afforded by embodiments described herein. In particular, active and/or interventional equipment such as tractors, sleeve shifting devices and others which are often devoid of sensor features may be more readily fitted or retrofitted with sensor capacity afforded by embodiments of interfaces detailed herein.

Figure 1:
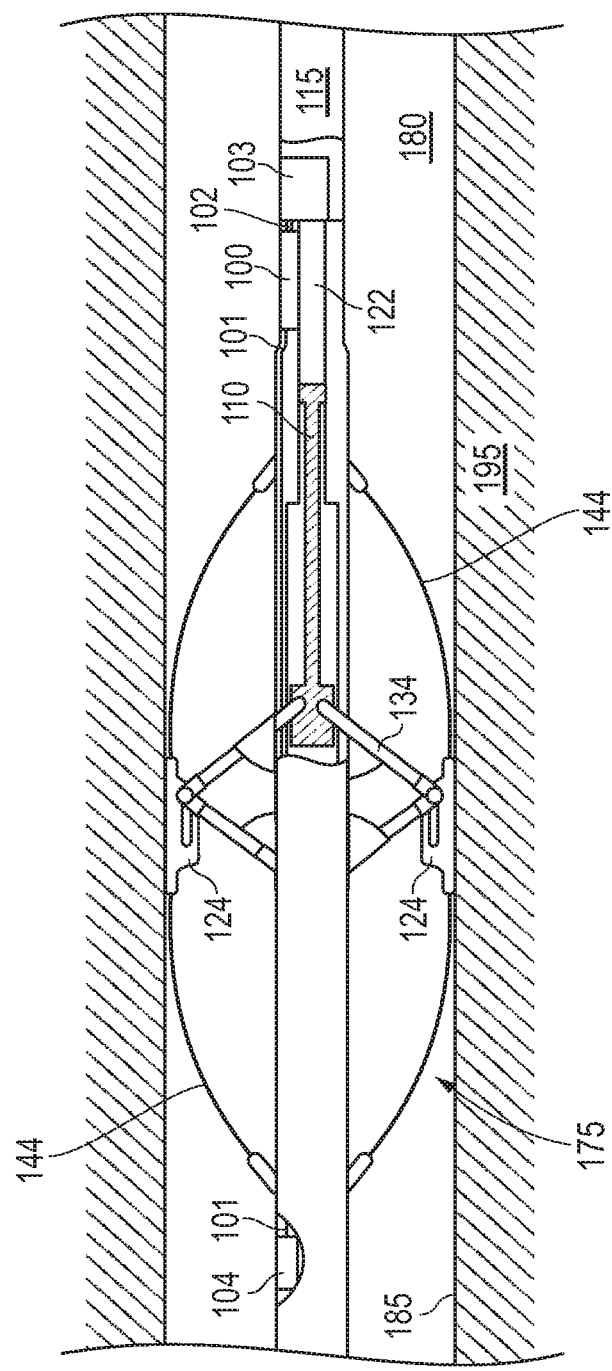
FIG. 1 is a side sectional view of a downhole assembly employing an embodiment of a downhole sensor interface.
Figure 4:
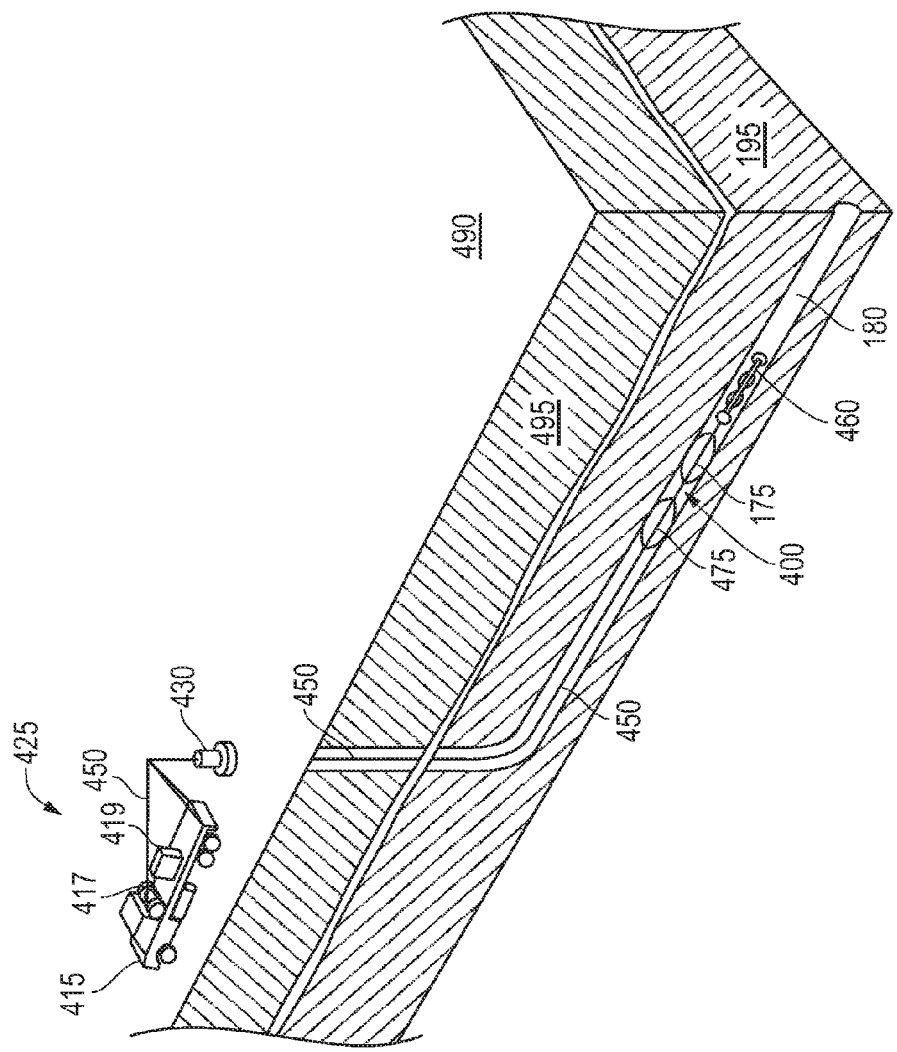
FIG. 4 is a perspective overview of the downhole assembly of FIG. 1 employed in a well at an oilfield.

Referring now to FIG. 1, an embodiment of a downhole sensor interface 100 is internally incorporated into the shaft 115 of a reciprocating tractor 400 near it's downhole sonde 175 (see FIG. 4). The sensor interface 100 is coupled at one end to multi-wire leads 102 of a sensor 103 which is described in greater detail below. The other end of the interface 100 is coupled to a power line 101 of a downhole microprocessor 104 configured to direct and interpret signals from the sensor 103. Thus, the downhole sensor interface 100 serves to allow for the interfacing of a single unitary power line 101 to multi-wire leads 102 in a manner that allows for effective power and data communication between the microprocessor 104 and the sensor 103.

Employing the downhole sensor interface 100 as indicated allows for the overall amount of wiring between the sensor 103 and the microprocessor 104 to be kept to a minimum. That is, all of the multi-wire leads 102, which may number about four wires, need not run the entire length between the sensor 103 and the microprocessor 104. As detailed below, this is achieved through techniques that result in a conversion of voltage to frequency signals that may be passed along the power line 101 to the microprocessor 104 simultaneously with power delivery to the sensor 103 along the same line 101.

As shown, in FIG. 1, the microprocessor 104 is incorporated into the shaft 115 at the opposite side of the sonde 175 relative to the sensor 103, perhaps a couple of feet away. Thus, given the mechanical workings of the sonde 175 as described below and the limited amount of spacing available, the use of a single power line 101 for electrical coupling between the sensor and microprocessor 104 is particularly advantageous. However, as described below, even in other embodiments where the microprocessor 104 is positioned closer to the sensor 103, the reduction in wiring may still be of substantial value.

In another embodiment, the microprocessor 104 and sensor 103 may be positioned closer to one another, perhaps initially less than 3 inches apart, but configured to allow for changing positions relative to one another. This may be beneficial, for example, where the downhole assembly is prone to a degree of deformation. Similarly, this may be beneficial where the sensor 103 is a pressure sensor that is physically responsive to pressure changes to a degree. Regardless, in such an embodiment, the power line 101 between the sensor 103 and microprocessor 104 may be of an expandable coiled configuration to allow for the change in position of the features (103, 104) relative to one another. This type of coupling may be seen in U.S. Pat. No. 6,396,414, incorporated herein by reference in its entirety. Even though positioned close to one another, the utilization of multiple wires to provide such communication may present a significant challenge for a coiled configuration as described. Thus, the use of the single power line 101 between the sensor 103 and microprocessor 104 as detailed herein may more easily allow for an effective coiled configuration to be employed.

Continuing with reference to FIG. 1, the mechanics of the tractor sonde 175 and the relationship to the sensor 103 are described in detail. That is, as shown, the sensor 103 is configured to monitor pressure in a chamber 122 as directed by a piston 110. Together, these features (103, 110, 122) serve as a force monitoring mechanism which may be employed to regulate the physical interaction of the sonde 175 and the wall 185 of the well 180. That is, as shown, the sonde 175 is equipped with bowsprings 144 that include gripping saddles 124 to grip the wall 185 during actuation by arms 134 that are coupled to the piston 110. However, the diameter of the well 180 at any given location may affect the amount of force imparted at the interface of the gripping saddles 124 and the wall 185. Thus, as described below, the sensor 103, piston 110 and chamber 122 may be employed to monitor this force to help reduce the possibility of under-expansion of the bowsprings 144 and slippage of the sonde 175. Similarly, these features 103, 110, 122 may be employed to help reduce the possibility of over-expansion of the bowsprings 144 in a manner damaging the bowsprings 144 or the wall 185 (and including avoidance of immobilizing of the bowsprings 144 by sinking into the wall 185).

Continuing with reference to FIG. 1, the sensor 103 is a pressure sensor such as a conventional solenoid or transducer. As indicated, the sensor 103 is configured to monitor pressure changes in the chamber 122. For example, where the diameter of the well 180 decreases as the tractor 400 moves through the well, the force on the bowsprings 144 increases (see FIG. 4). As such, the piston 110 is forced toward the chamber 122 increasing hydraulic pressure therein. As noted, this occurs in a manner detectable by the sensor 103. For example, the pressure in the chamber may be in the neighborhood of 20,000-40,000 psi. Information relative to this pressure may ultimately be recorded and interpolated by the microprocessor 104 so as to determine roughly the amount of force translating through the bowsprings 144. Thus, where applicable, corrective action may be taken when the detected force is above or below predetermined values of acceptability.

As indicated above, the information may be employed to control the amount of force translated through the bowsprings 144 so as to minimize damage to the well wall 185 during tractoring. For example, upon acquiring information indicative of forces exceeding a predetermined amount, the processor 104 may be employed to direct release of fluid from the chamber 122 via conventional means. In this manner, the pressure on the piston 110, and ultimately the forces translated through the bowsprings 144, may be reduced.

With added reference to FIG. 4, the downhole sonde 175 is part of a larger reciprocating tractor assembly 400 that also includes an uphole sonde 475. Together these sondes 175, 475 interchangeably engage the wall 185 of the well 180 as it drives through a formation 195 pulling several thousand pounds of an equipment load. When one of the sondes 175, 475 is engaged with the wall 185 for this inchworm-like advancement, a predetermined amount of force may be employed, for example, about 5,000 psi. In this manner, a sufficient, but not damaging, amount of force may be translated through anchored bowsprings 144 during a power stroke of the sonde 175, 475.

In an embodiment as described above, the microprocessor 104 may effectuate a deflation or release of fluid from the chamber 122 once forces greater than a predetermined value of about 5,000 psi are detected by the sensor 103. Similarly, the microprocessor 104 may direct inflating or filling of the chamber 122 once forces less than about 5,000 psi are detected. All in all, a window of between about 4,800 psi and about 5,200 psi of force through the bowsprings 144 may be maintained throughout the powerstroke or engagement of a given sonde 175, 475.

In the above example, a powerstroke is noted as the period of time in which a given sonde 175, 475 is anchored to the well wall 185 by the forces translated through the bowsprings 144. This anchoring force is ultimately monitored by the noted microprocessor 104 via the sensor 103 and through the interface 100. At other times during reciprocation of the tractor 100, however, a given sonde 175, 475 may be intentionally allowed to glide in relation to the well wall 185. During this "return" stroke, the acceptable pressure threshold may be different. However, pressure may still be monitored by the microprocessor 104 via the sensor 103 and interface 100 at this time.

Figure 2:
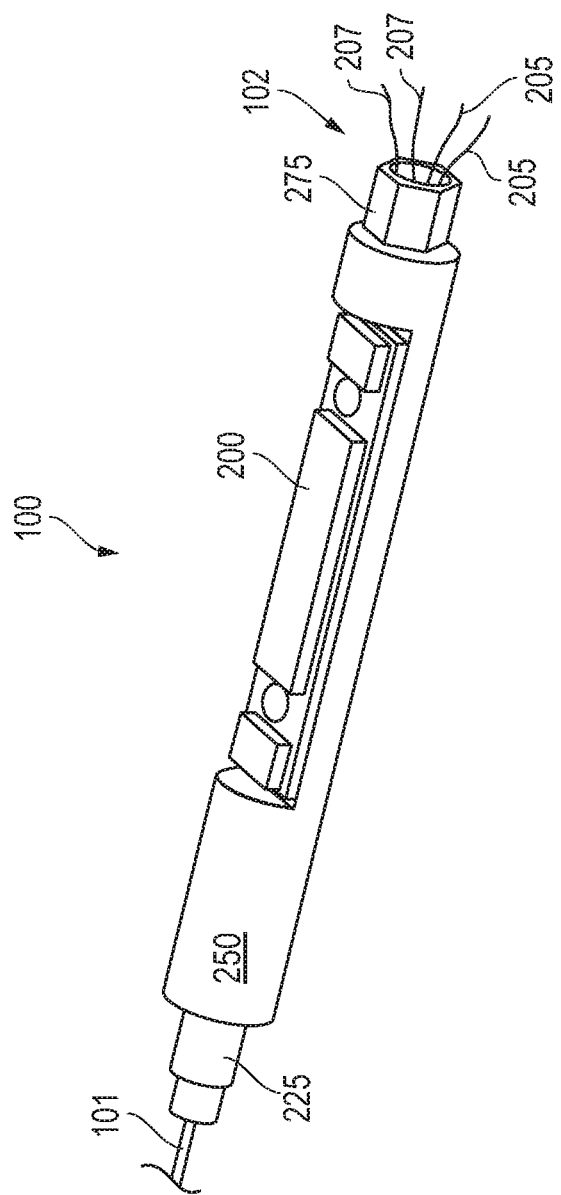
FIG. 2 is a perspective view of the downhole sensor interface of FIG. 1 revealing power line and multi-line couplings.

Continuing now with reference to FIG. 2, with added reference to FIG. 1, a perspective view of the downhole sensor interface 100 is depicted. The interface package may be less than about 2 inches in length by less than about half an inch in height. Thus, the sensor interface 100 is sufficiently small enough to be incorporated into the shaft 115 near the sonde 175 of a tractor 400 (see also FIG. 4). Additionally, given the downhole environment, the interface 100 may be rated for temperatures in excess of about 150° C.

The sensor interface 100 is equipped with a lead connector 275 as shown. Given that the sensor 103 may include multi-wire leads 102 as is common with a conventional strain gauge sensor, the lead connector 275 may be equipped for such multi-coupling. As shown in FIG. 2, the multi-wire leads 102 may include two input leads 205, one for power and the other for ground. Additionally, two output leads 207 may be provided for transmission of date acquired by the sensor 103 back uphole. The lead connector is configured to accommodate all such leads 102.

The sensor interface also includes a central housing 250 for accommodating downhole circuitry 200. This circuitry 200 is configured to effectively translate the nature of the multi-wire leads 102 described above to a single wire solution (i.e. over the power line 101). As such, the amount of wiring employed may be reduced as indicated above. The manner in which the circuitry 200 achieves this translation is described in detail with reference to FIGS. 3A and 3B below. In the embodiment shown, the circuitry 200 may be configured to accommodate up to about 20 volts from the power line 101. Additionally, a frequency signal of up to about 1.5 MHz may be transmitted back uphole over the power line 101 as directed by the circuitry 200.

Continuing with reference to FIG. 2, the sensor interface includes a power line coupling 225 which receives the power line 101 therein. The coupling 225 allows for electronic interfacing of the power line 101 and the circuitry 200 noted above. Thus, the power from the power line 101 may be transmitted downhole beyond the circuitry 200, across the input leads 205 and eventually to the sensor 103 of FIG. 1. Similarly, data obtained from the sensor 103 may eventually be transmitted back uphole across the power line 101.

Figure 3A:
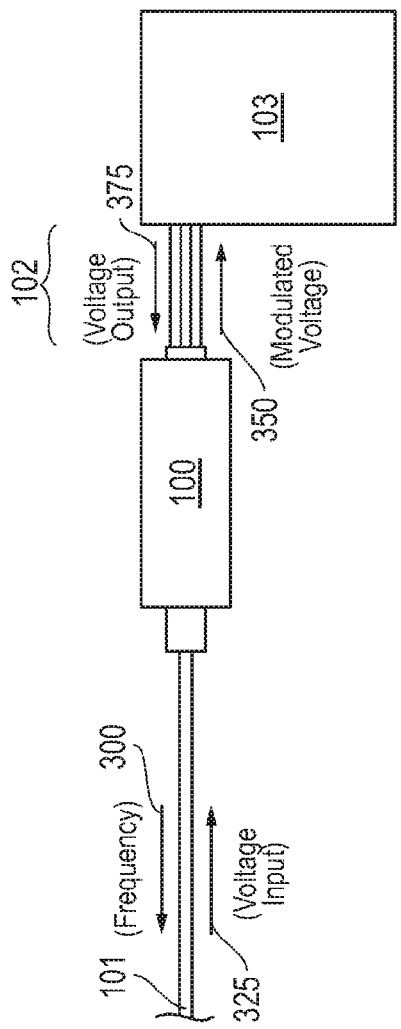
FIG. 3A is a schematic representation of the downhole assembly of FIG. 1 with focus on the electronic nature of the couplings of FIG. 2.

Referring now to FIG. 3A, a schematic representation of the assembly of FIG. 1 is shown. In particular, the electronic couplings of the sensor interface 100 are described. That is, as noted above, voltage (see arrow 325) is supplied over the power line 101 and directed toward the sensor 101. Depending on the amount of voltage supplied, the interface 100 may serve to modulate down the voltage supplied over the multi-wire leads 102 and to the sensor 103 (see arrow 350).

The powered sensor 103 may be utilized in a downhole environment as depicted in FIG. 1, for example, to monitor pressure. Depending on the sensor information obtained by the sensor 103 at this time, a voltage may then be transmitted back over the multi-wire leads 102 and processed by the interface 100. At this point, the sensor interface 100 may serve to convert this information signal from a voltage-based signal to frequency (i.e. Hz at arrow 300). Thus, the information relative to downhole conditions detected by the sensor 103 may be transmitted back over the power line 101 even though voltage is simultaneously incoming over the same line 101 (see arrow 325). As such, the amount of wiring required to utilize the assembly is reduced.

Figure 3B:
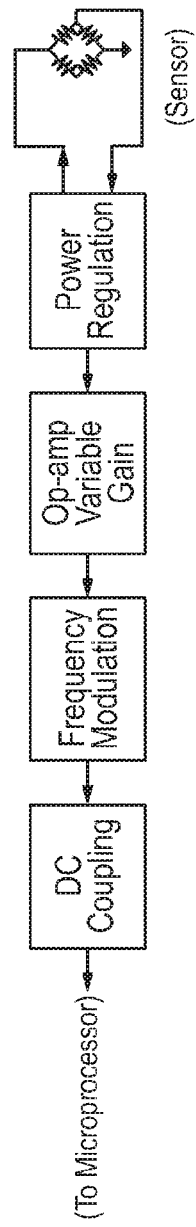
FIG. 3B is a block diagram revealing an embodiment of an electronic application series performed by the downhole sensor interface of FIG. 1.

Continuing now with reference to FIG. 3B, a block diagram revealing electronic applications of the downhole sensor interface 100 of FIG. 3B is depicted. For example, starting with the "Sensor", power thereto is regulated as indicated in the block labeled "Power Regulation". More specifically, in one embodiment voltage in excess of about 10 volts is regulated down to no more than about 5 volts (to the sensor). The powered sensor may then obtain readings, for example of pressure. For example, in a conventional strain gauge sensor setup, 20,000-40,000 PSI may be read as 200-400 mV. With this information detected, a conversion may take place to a smaller voltage scale as indicated by the block labeled "Op-amp Variable Gain".

In one embodiment, the application of "Op-amp Variable Gain" converts the large mV readings to a scale that is from 0-2.5 volts. Subsequently, an application of frequency modulation may be applied as indicated by the block labeled "Frequency Modulation". For example, the voltage reading may be converted to frequency. In one embodiment, the frequency range employed following the modulation application ranges from about 50 KHz to about 1.5 MHz. Regardless, once modulated, the frequency information may be transmitted back over the power line (as indicated by the block labeled "DC Coupling"). Thus, these frequency readings may be obtained and processed by the microprocessor detailed above.

Referring now to FIG. 4, a perspective overview of the downhole assembly of FIG. 1 is shown employed in the well 180 at an oilfield 490. As shown, the well 180 runs through various formation layers 195, 495. A tractor 400 which employs the assembly of FIG. 1, is deployed from the surface of the oilfield 490 via a conventional wireline 450. However, other forms of well access line may be employed. As shown in FIG. 4, several thousand feet of this wireline 450 may be run from wireline equipment 425 through a wellhead 430 and to the tractor 400 as shown. The equipment may include a conventional wireline truck 415 configured to accommodate a drum 417 from which the wireline 450 may be drawn. In the embodiment shown, control equipment 419 is also provided by way of the truck 415 to direct the deployment of the wireline 450 and associated tractoring.

The reciprocating tractor 100, which employs the downhole sonde 175 with sensor and interface as detailed herein, may be particularly adept at delivering a downhole tool 460, such as a logging tool, to a location as shown. For example, the location may be one of relatively challenging access such as a horizontal well section several thousand feet below surface as depicted. In such circumstances, the amount of load pulled by the tractor 400 may exceed several thousand pounds and continually increase as the tractor 400 advances deeper and deeper into the well 180. Thus, monitoring of tension and/or pressure via the assembly as detailed hereinabove may be of significant benefit to the well 180 and the tractor 400. Thus, the advantage of reduced wiring in order to accommodate the sensor and interface as detailed above may translate to significant benefit to continued downhole operations. This may be particularly the case where retrofitting of the tractor or other equipment is to be undertaken in order to accommodate the sensor and interface.

Figure 5:
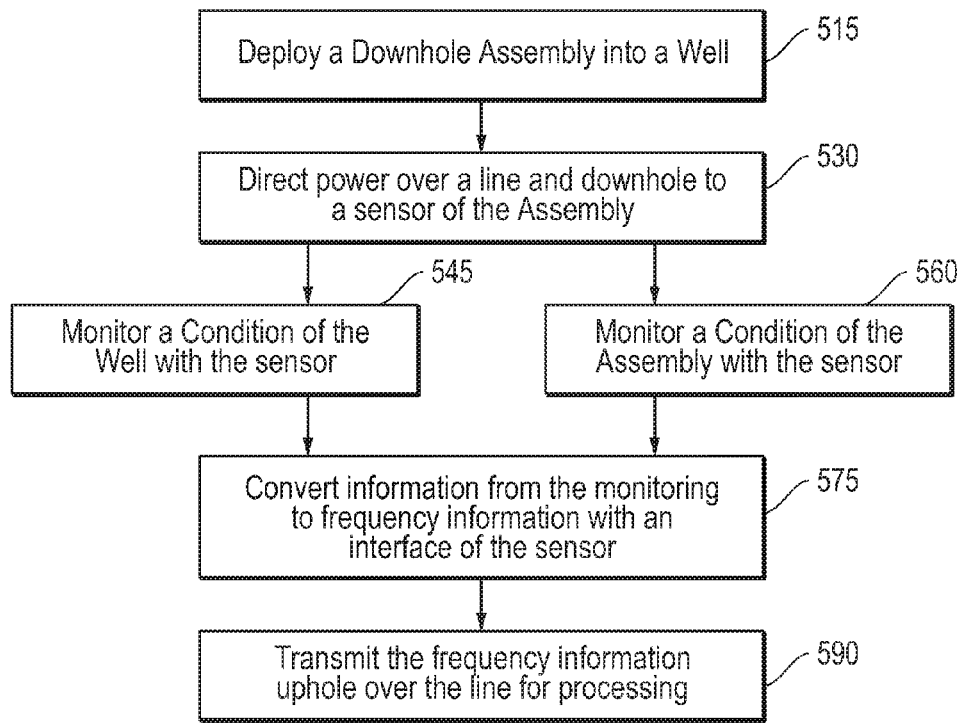
FIG. 5 is a flow-chart summarizing an embodiment of employing a downhole sensor interface.

Referring now to FIG. 5, a flow-chart summarizing an embodiment of employing a downhole sensor interface is described. Namely, the sensor may be provided as part of a larger assembly that is deployed downhole as indicated at 515 and described with reference to FIG. 4 above. As indicated at 530, power may be supplied in one direction over a unitary power line, for example, running from a downhole microprocessor and toward the sensor interface. This power may be modulated to a predetermined level and the sensor then employed to monitor a condition of the well or the assembly itself as indicated at 545 and 560.

As noted, the sensor may be employed to monitor a condition of the assembly as shown at 560. This is described in greater detail hereinabove where the sensor is employed to monitor pressure imparted through bowsprings of a tractor during downhole advancement thereof. However, the sensor may also be provided to monitor conditions of the well itself. For example, in another embodiment, the sensor may be provided as part of a logging tool.

Continuing now with reference to FIG. 5, the information obtained by the sensor may be converted to frequency information as indicated at 575. Thus, this information may be sent back over the same power line in the opposite direction of the above noted power input as indicated at 590. Thus, the amount of wiring running to and from the sensor interface may be kept to a minimum.

Embodiments described hereinabove allow for the incorporation of a sensor on downhole assemblies where space available is at a minimum. This is achieved through the use of a sensor interface which minimizes the amount of wiring that is required in order to utilize strain gauge based sensors. Such embodiments may be particularly beneficial for utilization with tractors and other assemblies which traditionally fail to leave space for sensor capacity thereat and thus, may require retrofitting.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. For example, strain gauge sensors other than pressure sensors, such as tension monitors may employ a sensor interface as detailed herein. Regardless, the foregoing description should not be read as pertaining only to the precise structures described and shown in the accompanying drawings, but rather should be read as consistent with and as support for the following claims, which are to have their fullest and fairest scope.

I claim:

1. A sensor interface for downhole use in a well, the interface comprising:
    a central housing configured to be disposed in a shaft of a downhole tool;
    circuitry disposed within the central housing;
    a lead connector of the central housing to couple multi-wire leads of a strain gauge sensor to said circuitry, the circuitry configured to effectively translate the nature of the multi-wire leads to a single wire solution and thereby reduce the amount of wiring employed within the sensor interface; and
    a power line coupling of the central housing to couple a power line to said circuitry, said circuitry configured to simultaneously obtain power and transmit data relative to the power line, wherein said sensor interface is less than about 0.5 inches by about 2 inches in size.

2. The sensor interface of claim 1 rated for exposure to temperatures in excess of about 150° C.

3. The sensor interface of claim 1 wherein the power is up to about 20 volts.

4. The sensor interface of claim 1 wherein the data is a frequency signal of up to about 1.5 MHz.

5. The electronic assembly of claim 1 wherein the power line comprises an expandable coiled power line.

6. An electronic assembly for downhole use in a well, the assembly comprising:
    a sensor for measuring a condition;
    an expandable coiled power line for supplying power to said sensor;
    an interface coupled to said power line and to multi-wire leads of said sensor for simultaneously allowing power and data over said power line; and
    a microprocessor coupled to said power line for power and data communication with said sensor while power and data are transmitted thereacross, the microprocessor positioned within about 3 inches of the sensor.

7. The electronic assembly of claim 6 wherein said sensor comprises a strain gauge sensor, said sensor configured for monitoring one of pressure, load, and tension.

8. The electronic assembly of claim 6 wherein the condition is relative to the assembly and/or the well.

9. The electronic assembly of claim 6 wherein the multi-wire leads comprise:
    at least two input leads; and
    at least two output leads.

10. The electronic assembly of claim 9 wherein said at least two input leads comprise:
    at least one power lead; and
    at least one ground lead.

* * * * *